United States Patent
Sugimoto

(10) Patent No.: US 7,878,531 B2
(45) Date of Patent: Feb. 1, 2011

(54) SEAT DEVICE

(75) Inventor: Shinichi Sugimoto, Tokyo (JP)

(73) Assignee: Takata Corporation, Tokyo (JP)

( * ) Notice: Subject to any disclaimer, the term of this patent is extended or adjusted under 35 U.S.C. 154(b) by 298 days.

(21) Appl. No.: 12/161,508

(22) PCT Filed: Oct. 16, 2006

(86) PCT No.: PCT/JP2006/320596

§ 371 (c)(1),
(2), (4) Date: Jul. 18, 2008

(87) PCT Pub. No.: WO2007/083423

PCT Pub. Date: Jul. 26, 2007

(65) Prior Publication Data
US 2010/0219619 A1    Sep. 2, 2010

(30) Foreign Application Priority Data

Jan. 18, 2006 (JP) .............................. 2006-009571

(51) Int. Cl.
*B60R 21/207* (2006.01)
(52) U.S. Cl. ............................ 280/730.1; 297/216.13
(58) Field of Classification Search .............. 280/728.2, 280/730.1, 743.1; 297/216.12, 216.13
See application file for complete search history.

(56) References Cited

U.S. PATENT DOCUMENTS 3,779,577 A * 12/1973 Wilfert ..................... 280/730.1
5,505,486 A * 4/1996 Ahn ......................... 280/730.1
5,556,129 A * 9/1996 Coman et al. ............. 280/730.2
5,782,529 A * 7/1998 Miller et al. ............. 297/216.13

(Continued)

FOREIGN PATENT DOCUMENTS

DE          196 15 096 A1     9/1996

(Continued)

OTHER PUBLICATIONS

English translation of the International Preliminary Report on Patentability (Chapter I of the Patent Cooperation Treaty) from the International Bureau for International Application No. PCT/JP2006/320596 dated Jul. 31, 2008, 6 pages.

*Primary Examiner*—Paul N Dickson
*Assistant Examiner*—Timothy D Wilhelm
(74) *Attorney, Agent, or Firm*—Fitch, Even, Tabin & Flannery

(57) ABSTRACT

To provide a seat device that can provide a smooth and stable deployment performance of an airbag.

A seat device includes a backrest 1B, an airbag 11, and an upper guide member 41 and a lower guide member 42. The backrest 1B includes a tear line at an upper portion thereof. The airbag 11 is formed of a bag member, in which base cloths are joined to each other, and is provided in an interior of the backrest 1B so that, during inflation, the airbag 11 cleaves the tear line 44 and is deployed to an upper side of the head of an occupant. The upper guide member 41 and the lower guide member 42 are provided in the interior of the backrest 1B so as to guide a deployment direction of the airbag 11 towards the vicinity of the tear line 44 while restricting the deployment direction during the inflation of the airbag 11.

7 Claims, 7 Drawing Sheets

U.S. PATENT DOCUMENTS

| | | | | |
|---|---|---|---|---|
| 5,833,312 A * | 11/1998 | Lenz | ..................... | 297/216.13 |
| 6,030,036 A * | 2/2000 | Fohl | ...................... | 297/216.14 |
| 6,095,550 A * | 8/2000 | O'Loughlin et al. | ..... | 280/730.1 |
| 6,572,137 B2 * | 6/2003 | Bossecker et al. | ........ | 280/730.1 |
| 7,040,651 B2 * | 5/2006 | Bossecker et al. | ........ | 280/730.1 |
| 7,150,468 B2 * | 12/2006 | Pan | ........................ | 280/730.1 |
| 7,318,601 B2 * | 1/2008 | Sugimoto et al. | ........ | 280/730.1 |
| 7,431,331 B2 * | 10/2008 | Siemiantkowski | ....... | 280/730.1 |
| 7,484,753 B2 * | 2/2009 | Sugimoto et al. | ........ | 280/730.1 |
| 7,722,074 B2 * | 5/2010 | Sugimoto | ............... | 280/728.2 |

FOREIGN PATENT DOCUMENTS

| | | |
|---|---|---|
| DE | 196 14 314 A1 | 10/1996 |
| JP | 04-356246 A | 12/1992 |
| JP | 08-258660 A | 10/1996 |
| JP | 09-240413 A | 9/1997 |
| JP | 10-071915 A | 3/1998 |
| JP | 10-338097 A | 12/1998 |
| JP | 11-342822 A | 12/1999 |
| JP | 2002-037011 A | 2/2002 |
| JP | 2002-145003 A | 5/2002 |
| JP | 2004-276906 A | 10/2004 |

* cited by examiner

SEAT DEVICE

TECHNICAL FIELD

The present invention relates to a seat device mounted to a vehicle, such as an automobile, and including an airbag in its interior.

BACKGROUND ART

Hitherto, various airbag devices, such as a driver airbag device that is inflated for deployment towards a driver from a rotational center of a steering wheel at a driver's seat, and a passenger airbag that is inflated for deployment towards a passenger's seat from an instrument panel, are used for restraining the body of an occupant when, for example, an automobile collides.

In recent years, an airbag device has already been proposed (refer to, for example, Patent Document 1) to overcome the following. That is, when a serious accident that applies a large external force to an automobile occurs, for example, overturning of a vehicle body, resulting from a collision, or falling of a heavy object, such as a tree, a shock may be applied to the head of an occupant from thereabove due to the shock generated during the serious accident.

[Patent Document 1] Japanese Unexamined Patent Application Publication No. 2005-37011

DISCLOSURE OF INVENTION

Problems to be Solved by the Invention

In the aforementioned related art, the following basic structure is discussed. That is, an airbag, formed of a bag member in which base cloths are joined to each other, is accommodated in a backrest of a seat of a vehicle, and the airbag is inflated by supplying a pressure fluid from an inflator in an emergency, to deploy the airbag towards the upper side of the head of an occupant.

In optimizing an airbag device provided in the seat, it is necessary to seek a smooth and stable deployment performance.

It is an object of the present invention to provide a seat device that can provide a smooth and stable deployment performance of an airbag device provided in a seat.

Means for Solving the Problems

To this end, a first invention provides a seat device comprising a backrest including a cleavage portion; an airbag provided in an interior of the backrest so that, during inflation, the airbag cleaves the cleavage portion and is deployed to an upper side of the head of an occupant; and a deployment-direction guide member provided in the interior of the backrest so as to guide a deployment direction of the airbag towards the vicinity of the cleavage portion while restricting the deployment direction during the inflation of the airbag.

When supplying a pressure fluid to the airbag, first, inflation of the air bag is started in the interior of the backrest, and, during the inflation, the cleavage portion of the backrest is pressed to cleave the cleavage portion. Then, the airbag is inflated towards the outside of the backrest through the opened cleavage portion, and is deployed towards the upper side of the head of the occupant.

According to the present invention, providing the deployment-direction guide member makes it possible to restrict deployment of the airbag in a direction other than in a direction towards the cleavage portion in the interior of the backrest during the inflation/deployment process, that is, to cause the airbag to preferentially reach the cleavage portion to cleave the cleavage portion. Therefore, it is possible to cause the airbag to quickly bulge out of the backrest and to smoothly deploy the airbag.

In addition, the deployment-direction guide member can restrict unnecessary deployment of the airbag in the interior of the backrest. Therefore, when the airbag bulges to the outside during the deployment after the cleavage of the cleavage portion, the airbag can smoothly bulge without stacking (getting caught) or excessive friction with respect to the interior of the backrest. Therefore, it is possible to increase stability of the deployment performance.

According to a second invention, the cleavage portion is provided at an upper portion of the backrest.

When supplying a pressure fluid to the airbag, and inflation of the airbag is started in the interior of the backrest, the cleavage portion, which is provided at the upper portion of the backrest, is pressed and cleaved during the inflation. Then, the airbag bulges to the outside of the backrest through the opened cleavage portion, so that it can be deployed towards the upper side of the head of the occupant.

According to a third invention, in the first invention or the second invention, the deployment-direction guide member includes an upper guide member disposed so as to restrict upward deployment of the airbag during the inflation of the airbag.

This makes it possible to effectively restrict deployment of the airbag when the airbag is deployed obliquely upward.

According to a fourth invention, in the third invention, the seat device further comprises a headrest at the top portion of the backrest, wherein the upper guide member is disposed so as to substantially match a tangent line that contacts a contour of a front side of the headrest from a back-side end portion of an area where the inflation of the airbag is started.

This makes it possible to restrict collision of the airbag that has bulged to the outside from the backrest against the headrest, so that the deployment performance can be further stabilized.

According to a fifth invention, in any one of the first to fourth inventions, the deployment-direction guide member includes a lower guide member disposed so as to restrict downward deployment of the airbag during the inflation of the airbag.

This makes it possible to restrict accidental downward deployment of the airbag that is deployed primarily obliquely upward.

According to a sixth invention, in any one of the first to fifth inventions, the seat device further comprises a strength supporting member supporting a load from an occupant and being disposed in the interior of the backrest, wherein the deployment-direction guide member is secured to or integrally formed with the strength supporting member.

This makes it possible to ensure that the deployment-direction guide member has the capability of restricting the deployment direction against expansibility of the airbag in the interior of the backrest.

ADVANTAGES

According to the present invention, it is possible to make smooth and to stabilize the deployment performance of the airbag provided in a seat.

BEST MODES FOR CARRYING OUT THE INVENTION

An embodiment of the present invention will hereunder be described with reference to the drawings.

FIG. 1 is a schematic side view of a seat device according to an embodiment, with FIG. 1(a) showing a normal state and FIG. 1(b) showing a state when an airbag is being inflated. In the following description, a forward direction is a direction in which an occupant seated on a seat faces the front (for example, the front of an automobile), and a backward direction is a direction opposite thereto. In FIG. 1, the seat device according to the embodiment comprises a seat 1, on which an occupant 2 is seated, and an airbag device 10, provided at the seat 1.

The seat 1 includes a sitting portion 1A, and a backrest 1B that protrudes upward from the sitting portion 1A. A headrest 1C is mounted to the top portion of the backrest 1B through a supporting portion 45.

In the seat 1, an airbag device 10 for restraining a head 2A of the occupant 2 when, for example, a vehicle body is overturned due to an accident is installed in the interior of the backrest 1B. The airbag device 10 includes an airbag 11, a retainer 12, and an inflator 13. The airbag 11 comprises a bag member, formed by sewing and connecting a first base cloth 35 and a second base cloth 36 to each other (refer to FIG. 4), and is provided so as to be deployed towards the upper side of the head 2A of the occupant 2 when the airbag 11 is inflated. The retainer 12 has an upper guide member (deployment-direction guide member) 41 and a lower guide member (deployment-direction guide member) 42 integrally formed thereat and accommodates the airbag 11 in a folded state. The inflator 13 supplies gas (pressure fluid) for inflating and deploying the airbag 11 (refer to FIGS. 2 and 3).

The seat 1 includes in its interior a seat frame (strength supporting member) 14 including side plates 14A (refer to FIG. 2) and a cross member 14B (refer to FIG. 2), and forming the skeleton of the seat 1. The retainer 12 and the inflator 13 are provided at the seat frame 14 (described in detail below). The entire sitting portion 1A and the entire backrest 1B of the seat 1 are covered with a skin cloth 1D. A tear line (cleavage portion) 44, which tends to tear compared to other portions, is formed by, for example, a perforated line along, for example, a horizontal straight line between the upper guide member 41 and the lower guide member 42 and at a front-side surface of the skin cloth 1D covering the backrest 1B.

Although not shown, various sensors that detect the occurrence of (or prediction of the occurrence of) overturning or collision (including side collision) of an automobile are provided in the automobile to which the airbag device 10 is installed. On the basis of detection signals from these sensors, an inflator controlling circuit (not shown) starts an initiator (not shown) of the inflator 13.

As shown in FIG. 1(a), in a normal state, the airbag 11 is accommodated in a folded state in the retainer 12. In contrast, when, for example, the automobile collides or is overturned as mentioned above, the sensors detect the collision or the overturning of the automobile, and a starting signal is input from the inflator controlling circuit to the initiator of the inflator 13, so that, as shown in FIG. 1(b), an upper deployment portion 38 of the airbag 11 is inflated, and is deployed between a roof 3 of the automobile and the head 2A of the occupant 2. At this time, the airbag 11 bulges to the outside after the tear line 44, formed in the skin cloth 1D of the backrest 1B, is cleaved, and is deployed towards the upper side of the head 2A of the occupant 2. Then, the airbag 11 is inflated so that the head 2A of the occupant 2 is pushed forward by the operation of a lower deployment portion 37 (refer to FIG. 1) of the airbag 11, causing the head 2A of the occupant 2 to bend forward, thereby making it possible to reduce a load on the neck.

FIG. 2 is a perspective view showing a structure in which the airbag device 10 is secured to the seat frame 14. FIG. 3 is an exploded perspective view of the airbag device 10, showing in more detail the aforementioned securing structure. In FIG. 3, to simplify the illustration, a portion of the upper guide member 41 is not shown.

In FIGS. 2 and 3, the seat frame 14 includes the pair of side plates 14A and 14A, provided at respective sides in a vehicle-width direction (that is, respective sides in a horizontal direction in FIG. 2) in the interior of the backrest 1B of the seat 1, and the cross member 14B, extending between the side plates 14A and 14A along substantially the vehicle-width direction and connecting the side plates 14A and 14A to each other. The side plates 14A and 14A and the cross member 14B are each provided in the interior of the backrest 1B of the seat 1. Although not particularly illustrated, the seat frame 14 includes a base plate provided in the interior of the sitting portion 1A.

A gas supply port (supply flow path) 11a, connected to the inflator 13 through a pipe member 20, and mounting portions 11b and 11b, positioned at respective sides of the gas supply port 11a, are provided at a base-end side (inflator side, lower side in FIG. 3) of the airbag 11. Two bolt holes 22 each for inserting mounting bolts 21a for securing the airbag 11 and the retainer 12 to each other are formed at the mounting portions 11b and 11b, respectively. The retainer 12 is formed by integrally forming a retainer body 43, formed of a box member, with the aforementioned upper guide member 41 and lower guide member 42. Mounting portions 12a and 12b, having bolt holes 24 for inserting mounting bolts 23 for securing the retainer 12, are formed at respective sides in the vehicle-width direction of the retainer body 43. A mounting portion 12c, similarly having bolt holes 25 at positions corresponding to the positions of the bolt holes 22 of the airbag mounting portions 11b, is provided below (at the inflator side, lower side in FIG. 3) the mounting portions 12a and 12b.

While the airbag 11 is folded and accommodated in the retainer body 43, the plurality of mounting bolts 21a (four in the embodiment) are inserted into the bolt holes 25 of the retainer mounting portion 12c, the bolt holes 22 of the airbag mounting portions 11b, and bolt holes 27, formed in mounting plates 26 at positions corresponding to the bolt holes 22 of the airbag mounting portions 11b; and are fastened with nuts 21b. This secures the airbag 11 to the retainer 12 while the airbag 11 is in a folded state. The mounting bolts 23 (two in the embodiment) are inserted into the bolt holes 24 of the retainer mounting portions 12a and 12b, and are, then, fastened to fastening holes (not shown) provided in the cross member 14B. Accordingly, the retainer body 43, in which the airbag 11 is accommodated in a folded state, is integrated to the upper guide member 41 and the lower guide member 42, and is secured to the cross member (strength supporting member) 14B.

In the state in which the retainer 12 is secured to the cross member 14B as mentioned above, the flat upper guide member 41 and lower guide member 42 integrally extend from an upper open portion of the retainer body 43, which is a box member. In addition, the upper guide member 41 and the lower guide member 42 have lengths that allow them to reach the vicinity of the inside surface of the skin cloth 1D of the backrest 1B (refer to FIG. 5).

The pipe member 20 is, for example, a metallic pipe that is bent at a plurality of locations (two locations in the embodiment), and is provided below the retainer 12. The pipe member 20 and the airbag 11 are connected to each other by covering a bag-side end portion 20a of the pipe member 20 with the gas supply port 35a of the airbag 11, and by caulking and securing them to each other with, for example, a metallic clamp band 30. The pipe member 20 and the inflator 13 are connected to each other by covering a top end portion 13a of the inflator 13 with a connection portion 20b, provided at an inflator-side end portion of the pipe member 20, and by fastening (or adhering) them to each other. Accordingly, the airbag 11 and the inflator 13 are connected to each other through the pipe member 20.

The inflator 13 is provided further below the pipe member 20, and is mounted to one of the side plates 14A (on the right side in the vehicle-width direction in the embodiment) with a mounting member 31. The mounting member 31 includes a pair of mounting plates 31A and 31B that support the inflator 13 as a result of being placed on both sides of the inflator 13. These mounting plates 31A and 31B are fastened to each other with bolts by inserting a plurality of bolts 31a (four in the embodiment), formed at the mounting plate 31A, into a plurality of bolt holes 31b (four in the embodiment), formed in corresponding positions of the mounting plate 31B, so that the mounting plates 31A and 31B are secured to each other as a result of being placed on both sides of the inflator 13. A mounting portion 31c is formed on one side (on the right side in the vehicle-width direction) of the mounting plate 31A so as to be bent by substantially 90 degrees. A plurality of mounting bolts (two in the embodiment) are inserted into respective bolt holes 33, formed in the mounting portion 31c, and are fastened to respective fastening holes (not shown) of the side plate 14A, so that the mounting member 31 is secured to the side plate 14A. As a result, the inflator 13 is secured to the side plate 14A through the mounting member 31.

The initiator (not shown) of the inflator 13 and the aforementioned inflator controlling circuit (not shown) are connected to each other with a cable 34, so that an ignition control of the inflator 13 is carried out through the cable 34.

FIG. 4 is a perspective view of the entire structure of the airbag 11 in a completely inflated and deployed state as seen obliquely from the back.

In FIG. 4, the airbag 11 comprises the bag member formed by sewing and connecting the first base cloth 35 and the second base cloth 36 as mentioned above. When the airbag 11 is in an inflated and deployed state as illustrated, the airbag 11 has a shape in which the lower deployment portion 37 and the upper deployment portion 38 are integrally formed. First, pressure fluid is supplied to the gas supply port 11a from the inflator 13, so that the lower deployment portion 37 is inflated and deployed at a side opposing the back of the head of the occupant, causing the head of the occupant to be bent forward. Then, the upper deployment portion 39 is inflated and deployed towards the upper side of the head of the occupant.

The operation of the airbag device 10 provided in the seat 1 having the above-described structure will be described.

FIGS. 5 and 6 are sectional views of the interior of the backrest 1B of the seat 1 in a front-back direction. FIG. 5 shows a state prior to inflating and deploying the airbag. FIG. 6 shows a state in which the airbag has been inflated and deployed. In FIGS. 5 and 6, the left side corresponds to the front side, and the right side corresponds to the back side (this similarly applies to FIG. 7 discussed below).

First, in FIG. 5, as mentioned above, the airbag 11 is folded and accommodated in the interior of the box retainer body 43, and the upper open portion of the retainer body 43 corresponds to an area (portion A in FIG. 5) where the inflation of the airbag 11 is started. The upper guide member 41 is provided so as to substantially match a tangent line B that contacts a contour of the front side of the headrest 1C from the back-side end of the inflation starting area A at the upper guide member 41, that is, from the upper end of the back-side wall of the retainer body 43. The lower guide member 42 is provided forwardly and upwardly from the front-side end portion of the inflation starting area of the airbag 11, that is, the upper end of the front-side wall of the retainer body 43.

When pressure fluid is supplied to the airbag 11 from the inflator 13, the inflation of the airbag 11 is started in the interior of the retainer body 43, and the airbag 11 is inflated while its deployment direction is restricted by the upper guide member 41 and the lower guide member 42. Then, during the inflation, a pressing force of the pressure fluid causes the surface of the airbag 11 to reach the tear line 44 of the backrest 1B, to press and cleave the tear line 44. By this, as shown in FIG. 6, the airbag 11 bulges to the outside of the backrest 1B through the opened tear line 44, and is deployed towards the upper side of the head of the occupant 2.

The airbag device 10 according to the embodiment described above has the following advantages.

That is, since the seat 1 according to the embodiment includes the upper guide member 41 and the lower guide member 42, during the inflation and deployment process, it is possible to restrict deployment of the airbag 11 in the interior of the backrest 1B in a direction other than in the direction of the tear line 44, that is, to cause the airbag 11 to preferentially reach the tear line 44 to cleave the tear line 44. Therefore, the airbag 11 can quickly bulge to the outside of the backrest 1B, and the deployment performance of the airbag 11 can be made smooth and can be stabilized.

When the interior of the backrest 1B has a hollow having a large volume, and is not provided with the upper guide member 41 and the lower guide member 42, as shown in FIG. 7, the airbag 11 is deployed to a size that is larger than necessary in the interior of the backrest 1B prior to the cleavage of the tear line 44. In contrast, since the seat 1 according to the embodiment includes the upper guide member 41 and the lower guide member 42, it is possible to restrict unnecessary deployment of the airbag 11 in the interior of the backrest 1B. Therefore, when the airbag 11 that is being deployed bulges to the outside after the tear line 44 is cleaved, the airbag 11 can smoothly bulge without stacking (getting caught) or excessive friction with respect to the interior of the backrest 1B, thereby making it possible to increase the stability of the deployment performance.

In the embodiment, since the upper guide member 41, disposed so as to restrict upward deployment of the airbag 11 during the inflation of the airbag 11, is provided, it is possible to effectively restrict the deployment of the airbag that is primarily deployed obliquely upward.

In addition, the upper guide member 41 is disposed so as to substantially match the tangent line B that contacts the contour of the front side of the headrest 1C from the back-side end of the inflation starting area A of the airbag 11. Therefore, collision of the airbag 11 that has bulged to the outside from the backrest 1B with the headrest 1C can be restricted, so that the inflation/deployment performance can be made more stable.

Further, in the embodiment, since the lower guide member 42, disposed so as to restrict downward deployment of the airbag 11 during the inflation of the airbag 11, is provided, it possible to restrict accidental downward deployment of the airbag that is deployed primarily obliquely upward.

Further, in the embodiment, the upper guide member 41 and the lower guide member 42 are integrated to the retainer body 43, and secured to the seat frame 14 (cross member 14B), which is the strength supporting member, so that it is possible to ensure that the upper guide member 41 and the lower guide member 42 have the capability of restricting the deployment direction against expansibility of the airbag 11 in the interior of the backrest 1B.

It is possible to provide the upper guide member 41 and the lower guide member 42 using a highly rigid material, such as steel or alumina, and separately from the retainer 12, and to separately secure them to the seat frame 14 or other strength supporting members (such as the supporting portion of the headrest 1C) (or they may be integrated to, for example, the seat frame 14, the headrest supporting portion, and the sitting portion 1A of the seat 1). The shape of the upper guide member 41 and the lower guide member 42 is not limited to a flat shape, so that the shape may be curved as required so as to allow proper deployment of the airbag 11.

The specific structure according to each above-described embodiment does not, strictly speaking, limit the content of the present invention. The details can obviously be variously changed in accordance with the gist of the present invention.

REFERENCE NUMERALS

Figure 1:
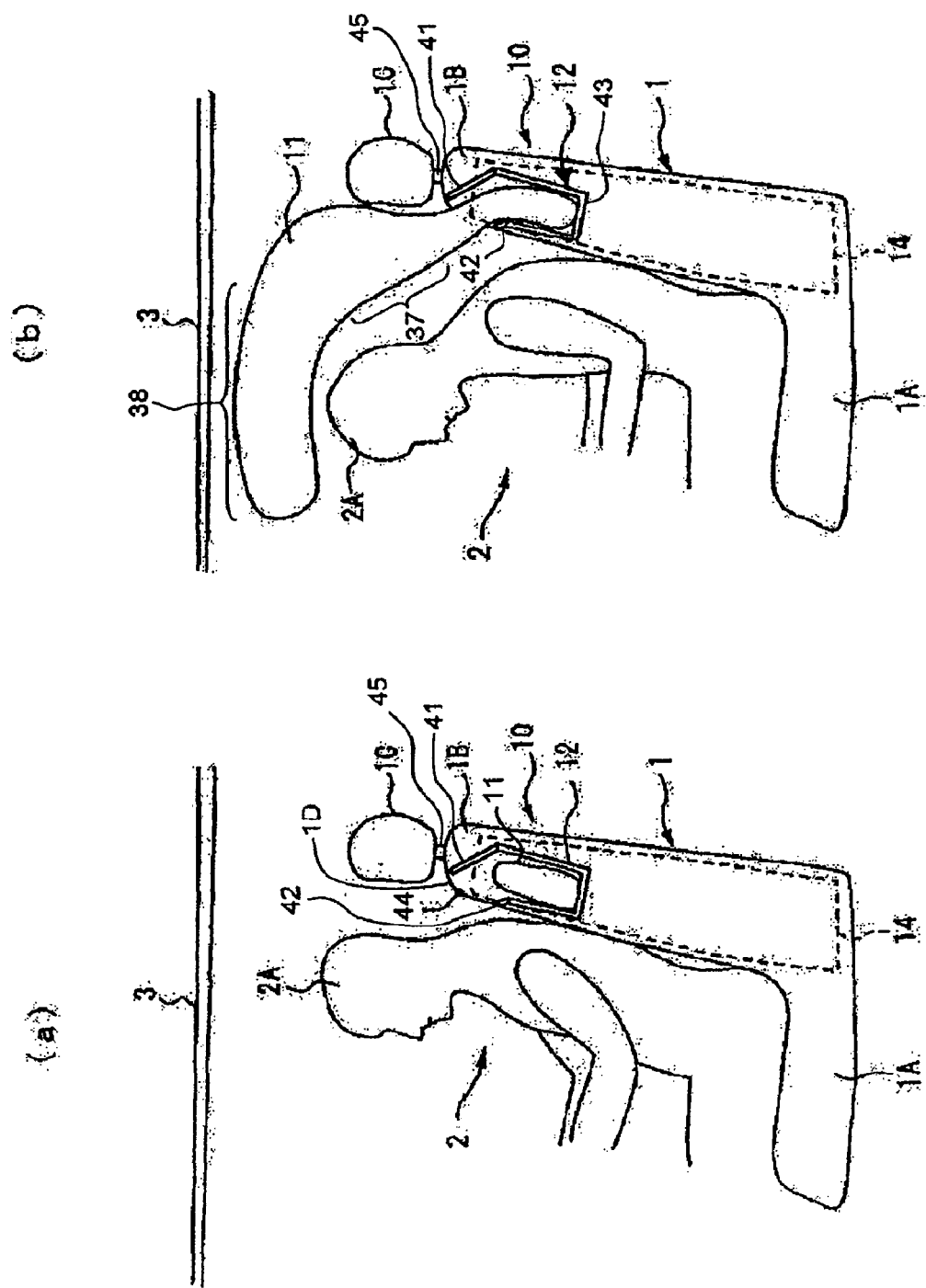
FIG. 1 is a schematic side view of a seat device according to an embodiment of the present invention.

1 seat
1B backrest
1D display cloth
1C headrest
2 occupant
10 airbag device
11 airbag
12 retainer
13 inflator
14 seat frame (strength supporting member)
14B cross member (strength supporting member)
35 first base cloth
36 second base cloth
37 lower deployment portion
38 upper deployment portion
41 upper guide member (deployment-direction guide member)
42 lower guide member (deployment-direction guide member)
43 retainer body
44 tear line (cleavage portion)

The invention claimed is:

1. A seat device comprising:
a backrest including a cleavage portion;
an airbag provided in an interior of the backrest so that, during inflation, the airbag cleaves the cleavage portion and is deployed to an upper side of the head of an occupant;
a deployment-direction guide member provided in the interior of the backrest so as to guide a deployment direction of the airbag towards the vicinity of the cleavage portion while restricting the deployment direction during the inflation of the airbag, wherein the deployment-direction guide member includes an upper guide de member disposed so as to restrict upward deployment of the airbag during the inflation of the airbag; and
a headrest at the top portion of the backrest, wherein the upper guide member is disposed so as to substantially match a tangent line that contacts a contour of a front side of the headrest from a back-side end portion of an area where the inflation of the airbag is started.

2. The seat device according to claim 1, wherein the cleavage portion is provided at an upper portion of the backrest.

3. The seat device according to claim 1, wherein the deployment-direction guide member includes a lower guide member disposed so as to restrict downward deployment of the airbag during the inflation of the airbag.

4. The seat device according to claim 1, further comprising a strength supporting member supporting a load from an occupant and being disposed in the interior of the backrest, wherein the deployment-direction guide member is secured to or integrally formed with the strength supporting member.

5. The seat device according to claim 1, wherein the deployment-direction guide member includes a lower guide member disposed so as to restrict downward deployment of the airbag during the inflation of the airbag.

6. A seat device comprising:
a backrest including a cleavage portion;
an airbag provided in an interior of the backrest so that during inflation the airba cleaves the cleavage portion and is deployed to an upper side of the head of an occupant;
a deployment-direction guide member provided in the interior of the backrest so as to guide a deployment direction of the airbag towards the vicinity of the cleavage portion while restricting the deployment direction during the inflation of the airbag, wherein the cleavage portion is provided at an upper portion of the backrest, and the deployment-direction guide member includes an upper guide member disposed so as to restrict upward deployment of the airbag during the inflation of the airbag; and
a headrest at the top portion of the backrest, wherein the upper guide member is disposed so as to substantially match a tangent line that contacts a contour of a front side of the headrest from a back-side end portion of an area where the inflation of the airbag is started.

7. The seat device according to claim 6, wherein the deployment-direction guide member includes a lower guide member disposed so as to restrict downward deployment of the airbag during the inflation of the airbag.

* * * * *

UNITED STATES PATENT AND TRADEMARK OFFICE
CERTIFICATE OF CORRECTION

| | | |
|---|---|---|
| PATENT NO. | : 7,878,531 B2 | |
| APPLICATION NO. | : 12/161508 | |
| DATED | : February 1, 2011 | |
| INVENTOR(S) | : Sugimoto | |

It is certified that error appears in the above-identified patent and that said Letters Patent is hereby corrected as shown below:

On the Title Page

Replace the paragraph of the Item (57) Abstract with the following:

-- A seat device is provided that can provide a smooth and stable deployment performance of an airbag. In one form, a seat device includes a backrest, an airbag, and an upper guide member and a lower guide member. The backrest includes a tear line at an upper portion thereof. The airbag is formed of a bag member, in which base cloths are joined to each other, and is provided in an interior of the backrest so that, during inflation, the airbag cleaves the tear line and is deployed to an upper side of the head of an occupant. The upper guide member and the lower guide member are provided in the interior of the backrest so as to guide a deployment direction of the airbag towards the vicinity of the tear line while restricting the deployment direction during the inflation of the airbag. --.

In the Specification

On page 1, Column 1, Line 2, after the Title and before the section heading entitled "TECHNICAL FIELD", insert the following new section:
 -- CROSS-REFERENCE TO RELATED APPLICATIONS This application is a U.S. national phase application filed under 35 U.S.C. § 371 of International Application PCT/JP2006/320596, filed on October 16, 2006, designating the United States, which claims priority from JP 2006-009571, filed January 18, 2006, which are hereby incorporated herein by reference in their entirety, --.

On pages 1, Column 1, Line 20, delete "Patent Document 1" and insert -- Japanese Unexamined Patent Application Publication No. 2005-37011 --.

Signed and Sealed this
Thirty-first Day of May, 2011

David J. Kappos
*Director of the United States Patent and Trademark Office*

CERTIFICATE OF CORRECTION (continued)
U.S. Pat. No. 7,878,531 B2

On pages 1, Column 1, Line 28 and 29, delete "[Patent Document 1] Japanese Unexamined Patent Application Publication No. 2005-37011".

On pages 1, Column 1, Line 31, delete the section heading "DISCLOSURE OF INVENTION".

On pages 1, Column 1, Line 33, delete the section heading "Problems to be Solved by the Invention".

On pages 1, Column 1, Line 45, insert the following new section title:
-- SUMMARY OF THE INVENTION --.

On pages 1, Column 1, Line 49, delete the section heading "Means for Solving the Problems".

On pages 2, Column 3, Line 6, delete the section heading "ADVANTAGES".

On pages 2, Column 3, Line 12 and 13, delete the section heading "BEST MODES FOR CARRYING OUT THE INVENTION".

On pages 2, Column 3, Line 14, insert the following new section:
-- BRIEF DESCRIPTION OF THE DRAWINGS Fig. 1 is a schematic side view of a seat device according to an embodiment of the present invention.

Figure 2:
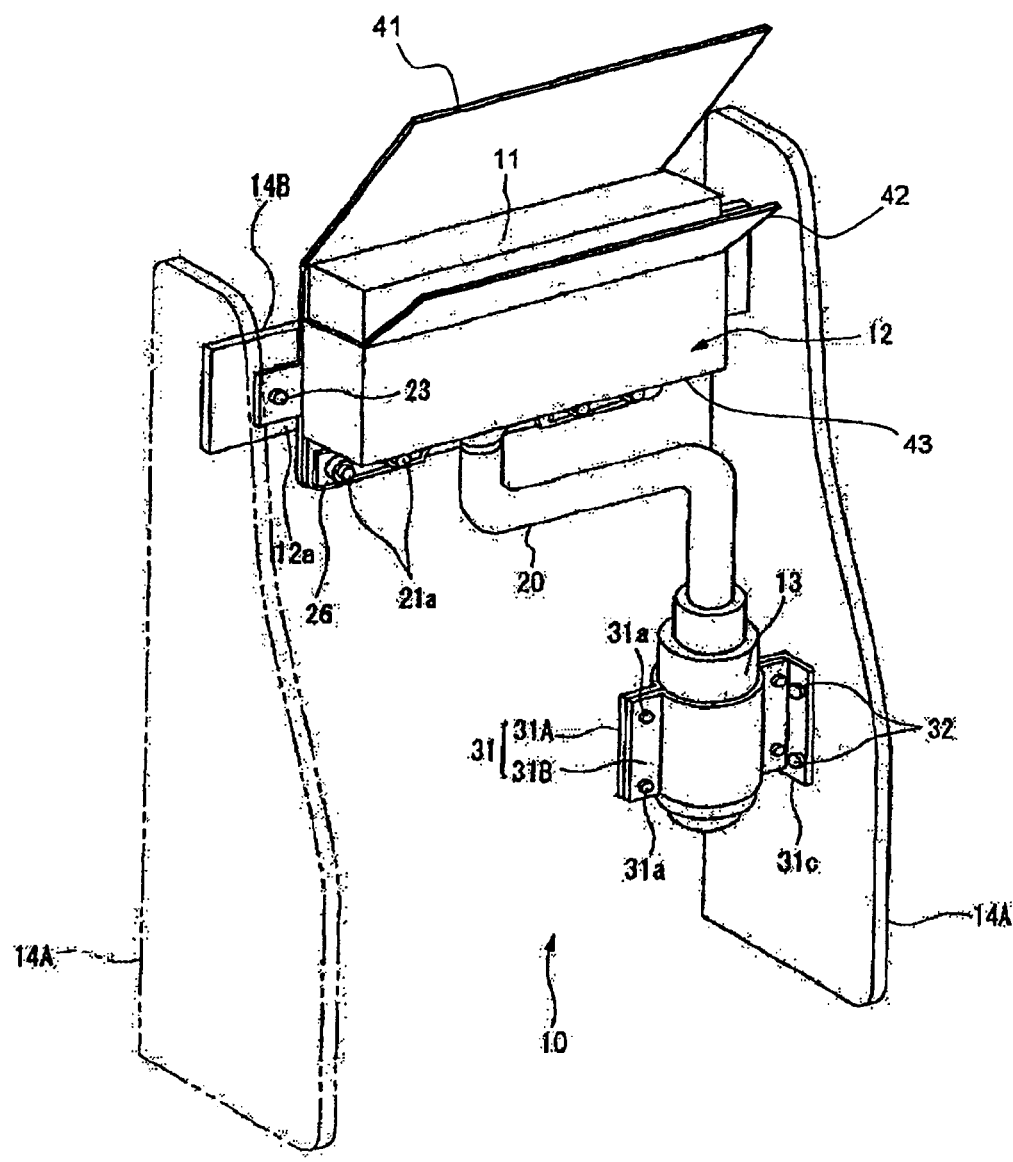
FIG. 2 is a perspective view showing a structure in which an airbag device is secured to a seat frame.

Fig. 2 is a perspective view showing a structure in which an airbag device is secured to a seat frame.

Figure 3:
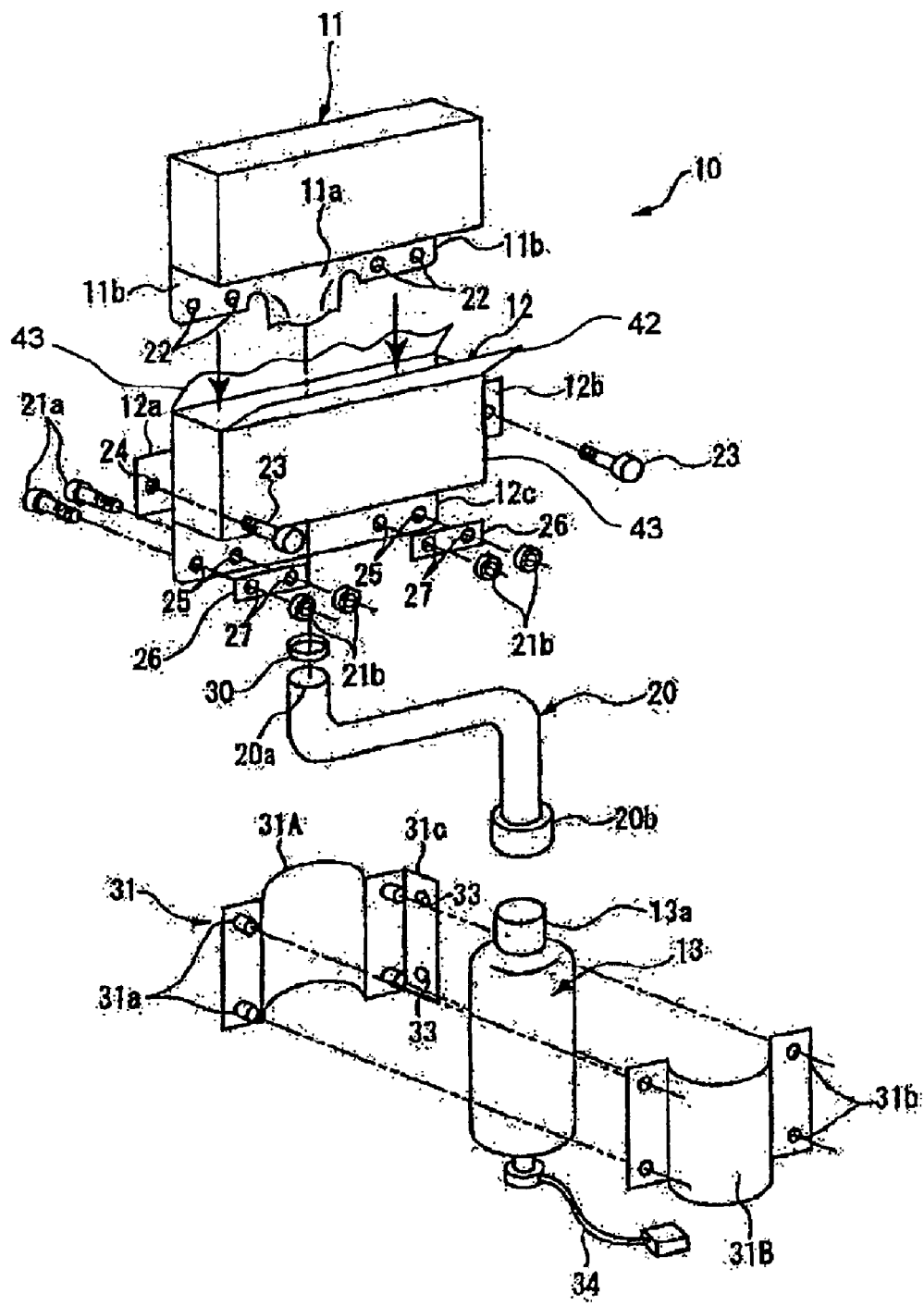
FIG. 3 is an exploded perspective view of the airbag device, showing the securing structure shown in FIG. 2 in more detail.

Fig. 3 is an exploded perspective view of the airbag device, showing the securing structure shown in Fig. 2 in more detail.

Figure 4:
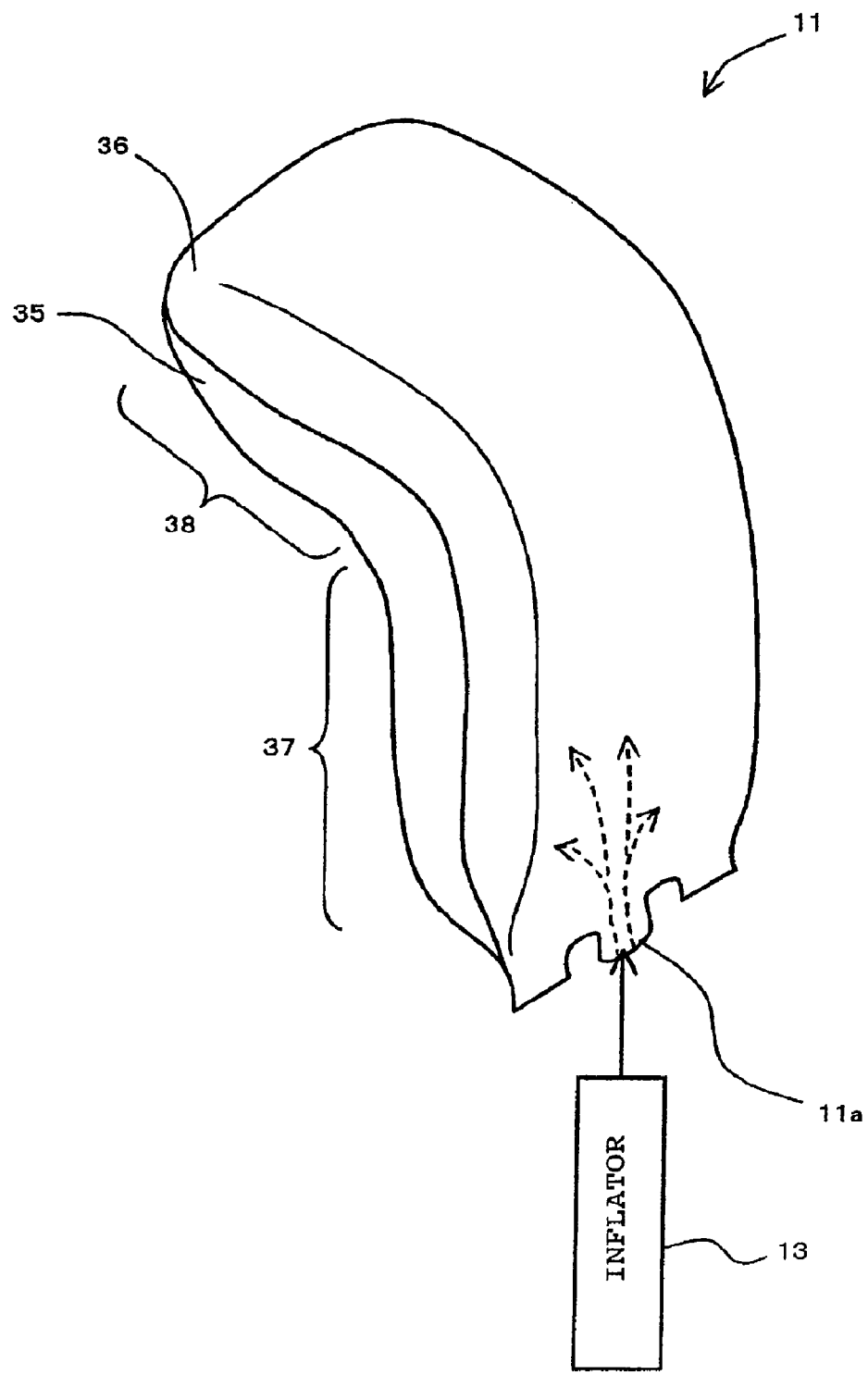
FIG. 4 is a perspective view of the entire structure of an airbag in a completely inflated and deployed state as seen obliquely from the back.

Fig. 4 is a perspective view of the entire structure of an airbag in a completely inflated and deployed state as seen obliquely from the back.

Figure 5:
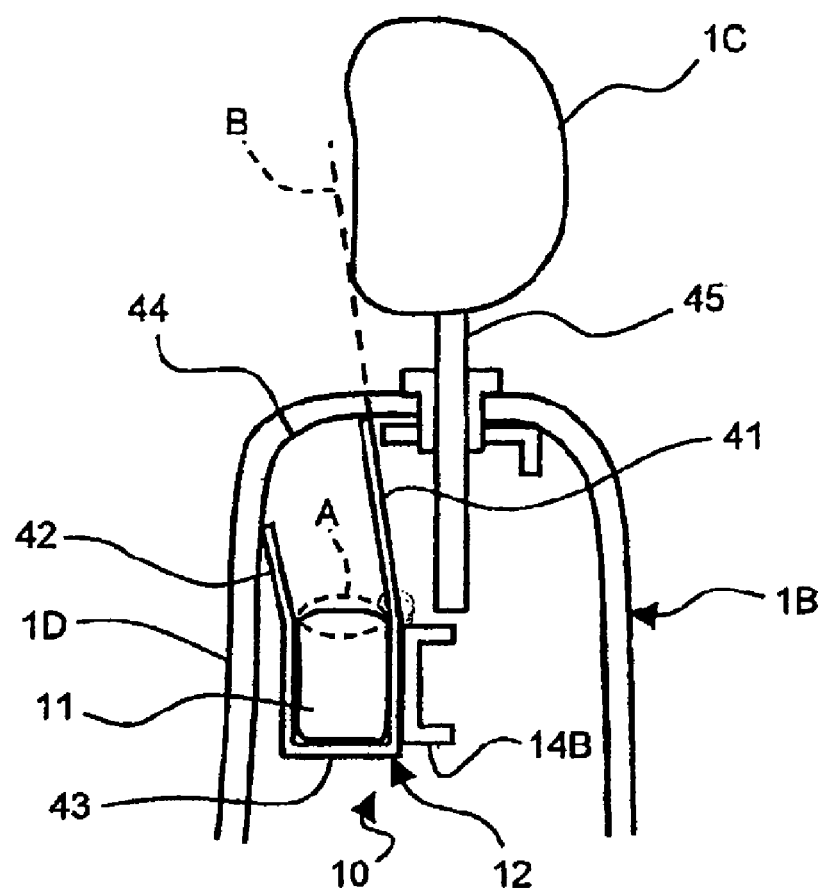
FIG. 5 is a sectional view in a front-back direction of the interior of a backrest of a seat prior to inflating and deploying the airbag.

Fig. 5 is a sectional view in a front-back direction of the interior of a backrest of a seat prior to inflating and deploying the airbag.

Figure 6:
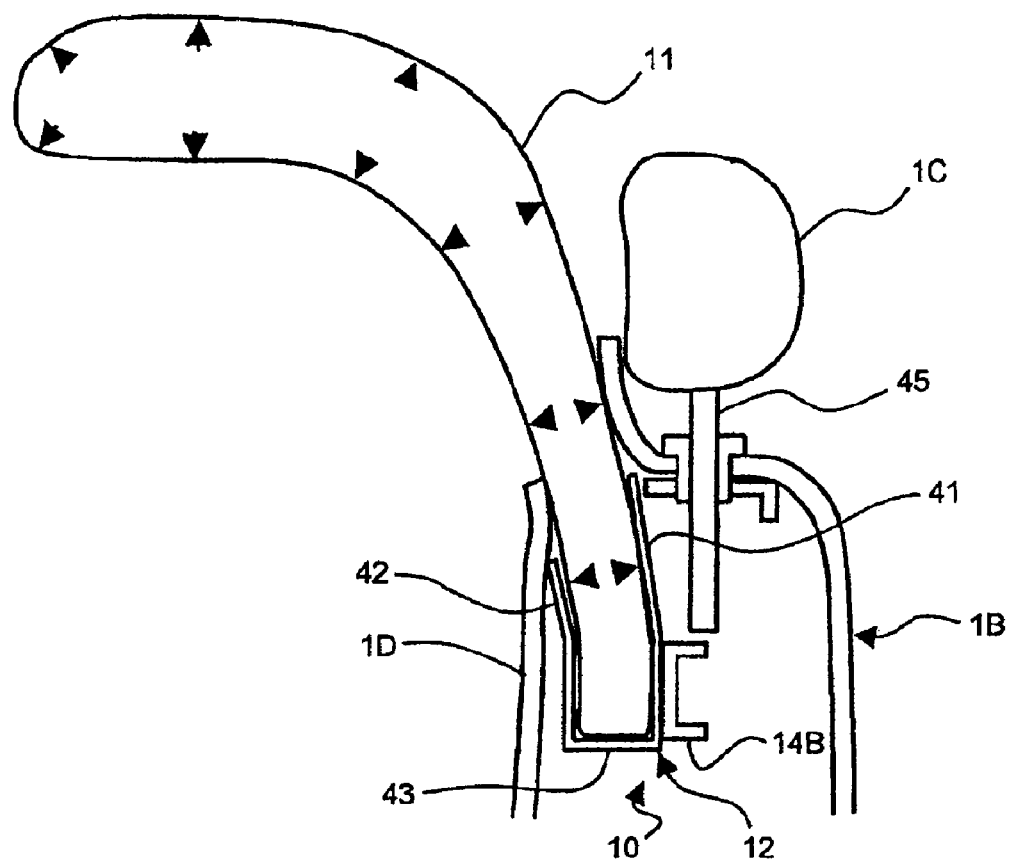
FIG. 6 is a sectional view in the front-back direction of the interior of the backrest of the seat when the airbag has been inflated and deployed.

Fig. 6 is a sectional view in the front-back direction of the interior of the backrest of the seat when the airbag has been inflated and deployed.

Figure 7:
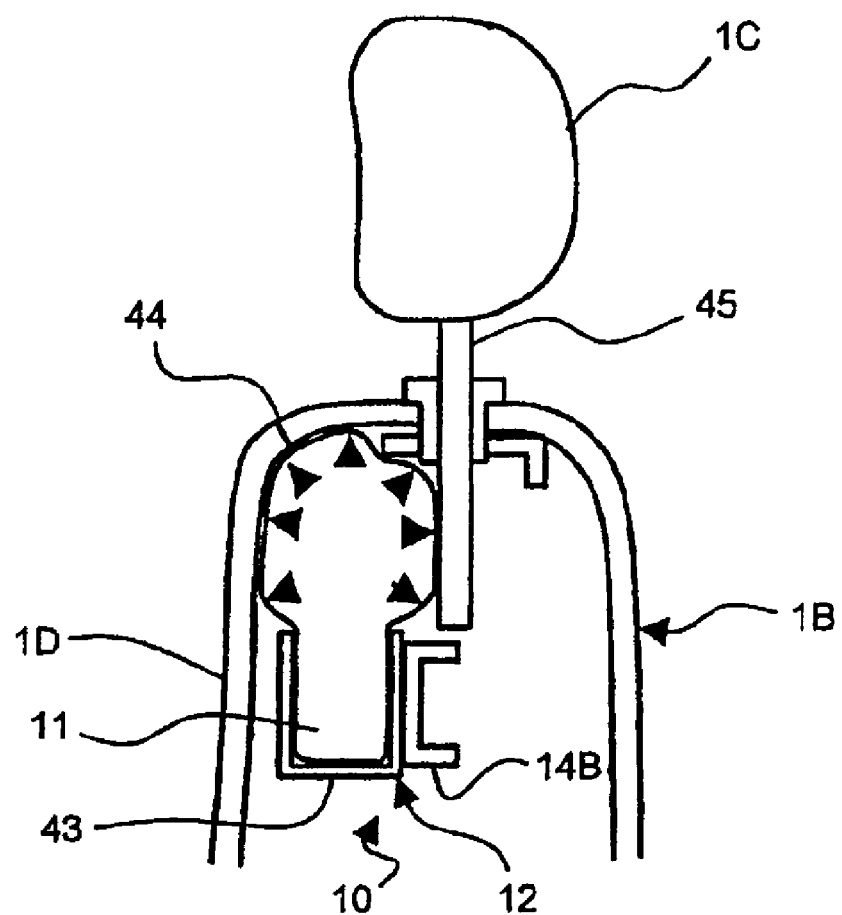
FIG. 7 is a sectional view in the front-back direction of the interior of the backrest of the seat while the airbag is being inflated and deployed when an upper guide member and a lower guide member are not provided.

Fig. 7 is a sectional view in the front-back direction of the interior of the backrest of the seat while the airbag is being inflated and deployed when an upper guide member and a lower guide member are not provided. --.

On pages 2, Column 3, Line 14, insert the following new section heading:
-- DETAILED DESCRIPTION OF THE PREFERRED EMBODIMENTS --.

On pages 3, Column 7, Line 36, delete the following section:
"BRIEF DESCRIPTION OF THE DRAWINGS Fig. 1 is a schematic side view of a seat device according to an embodiment of the present invention.

Fig. 2 is a perspective view showing a structure in which an airbag device is secured to a seat frame.

Fig. 3 is an exploded perspective view of the airbag device, showing the securing structure shown in Fig. 2 in more detail.

Fig. 4 is a perspective view of the entire structure of an airbag in a completely inflated and deployed state as seen obliquely from the back.

Fig. 5 is a sectional view in a front-back direction of the interior of a backrest of a seat prior to inflating and deploying the airbag.

Fig. 6 is a sectional view in the front-back direction of the interior of the backrest of the seat when the airbag has been inflated and deployed.

Fig. 7 is a sectional view in the front-back direction of the interior of the backrest of the seat while the airbag is being inflated and deployed when an upper guide member and a lower guide member are not provided.".

On pages 3, Column 7, Line 58, delete the following section:
"REFERENCE NUMERALS

| | |
|---|---|
| 1 | seat |
| 1B | backrest |
| 1D | display cloth |
| 1C | headrest |
| 2 | occupant |
| 10 | airbag device |
| 11 | airbag |
| 12 | retainer |
| 13 | inflator |
| 14 | seat frame (strength supporting member) |
| 14B | cross member (strength supporting member) |
| 35 | first base cloth |
| 36 | second base cloth |
| 37 | lower deployment portion |
| 38 | upper deployment portion |

| | |
|---|---|
| 41 | upper guide member (deployment-direction guide member) |
| 43 | retainer body |
| 44 | tear line (cleavage portion)". |

In the Claims

Claim 1, Column 8, Line 27, after guide, delete "de".

Claim 6, Column 8, Line 52, delete "so that" and insert -- so that, --.

Claim 6, Column 8, Line 53, delete "inflation" and insert -- inflation, --.

Claim 6, Column 8, Line 53, delete "airba" and insert -- airbag --.